UNITED STATES PATENT OFFICE 2,123,844

VULCANIZATION OF RUBBER

Howard I. Cramer, Cuyahoga Falls, Ohio, assignor to Wingfoot Corporation, Wilmington, Del., a corporation of Delaware No Drawing. Original application October 20, 1934, Serial No. 749,312. Divided and this application June 3, 1936, Serial No. 83,265

9 Claims. (Cl. 260—44)

This invention relates to a class of compounds, new in and of themselves, which have been found to be excellent accelerators of the vulcanization of rubber. It concerns that class of accelerators known as substituted ammonium salts of mercaptothiazoles. I have discovered a new class of these salts; namely, the ammonium thiazyl sulphides in which the ammonium radical contains at least one substituent embodying a furane ring. While the compounds may be prepared by other methods as well, they are preferably formed by the simple expedient of refluxing substantially molar quantities of the desired amine containing a furane ring with a suspension of the desired mercaptothiazole in an inert solvent for a suitable period, generally about an hour. These materials may also be prepared by simply bringing together the reactants in an inert solvent at normal room temperatures.

The following are illustrative examples of mercaptothiazoles which may be employed: 2-mercaptobenzothiazole, 2-mercapto 4-phenyl thiazole, 6-methyl mercaptobenzothiazole, 5- or 6-chloro mercaptobenzothiazole, 6-amino mercaptobenzothiazole, 5- or 6-nitro mercaptobenzothiazole, 5-chlor 6-nitro mercaptobenzothiazole, 4-methyl mercaptobenzothiazole, 2-mercapto naphtho thiazole, 2-mercapto 4-phenyl benzothiazole, 2-mercaptothiazole, 2-mercapto 4-methyl thiazole, the 2-mercapto xylyl thiazoles, 2-mercapto 5-methoxy benzothiazole, 2-mercapto 5-ethoxy benzothiazole, and other halogen-, nitro-, hydroxy-, alkoxy-, and amino-substituted arylene mercapto thiazoles.

Amines containing a furane ring reactive with the mercapto thiazoles hereinbefore set forth may be represented by the general formula $$R-N\begin{matrix}R'\\ \\R''\end{matrix}$$

wherein R is a group containing a furane ring, and R' and R" are monovalent radicals such as hydrogen or alkyl, alicyclic, furyl, furfuryl, beta furyl ethyl, or aralkyl groups. Also R' and R" may together represent an alkylene chain which may, if desired, be interrupted by an oxygen or sulphur atom. While the primary and secondary amines of this type are preferable it will be understood that the more basic tertiary amines also form derivatives with mercapto thiazoles which are accelerators of vulcanization. In general any amine containing a furane ring in which aliphatic characteristics predominate may be employed in the practice of the invention. A more specific formula representing a preferred class of the amines of the invention is the following:

$$R-(CH_2)_n-N\begin{matrix}R'\\ \\R''\end{matrix}$$

wherein the R groups represent the same groups expressed above and $n$ is one or more.

Illustrative of the amines containing a furane ring are the primary amines such as alpha furfuryl amine, beta furfuryl amine, alpha furyl amine and beta furyl amine. Examples of secondary and tertiary amines are di alpha- and beta-furfuryl amines, di alpha- and beta-furyl amines, N-ethyl alpha- and beta-furfuryl amines, N-cyclohexyl alpha- and beta-furfuryl amines, N-benzyl alpha- and beta-furfuryl amines, N-alpha- and beta-furfuryl piperidines, di(alpha- or beta-2-furyl ethyl) amines, N-morpholyl alpha furfuryl amines, N-methyl alpha furfuryl amine, N-iso butyl alpha furfuryl amine, N-beta phenyl ethylene alpha furfuryl amine, N-iso propyl alpha furfuryl amine, N-iso amyl alpha furfuryl amine, and the N-hexahydro tolyl alpha furfuryl amines.

In the reaction of these amines with the mercapto thiazoles the nitrogen atom of the amino group is apparently added directly to the sulphur in the mercapto group. Thus, in the preparation of alpha furfuryl ammonium benzo thiazyl sulphide one mol. of alpha furfuryl amine may be refluxed with a suspension of one mol. of mercaptobenzothiazole in high test gasoline for a period of approximately one hour. The resulting product when recrystallized from alcohol is an almost white, crystalline solid having a melting point of 85–95° C. Upon being titrated using methyl red indicator, 0.5446 gram required 19.2 cc. of N/10 acid, thus indicating the presence of 93.5% of alpha furfuryl ammonim benzothiazyl sulphide.

The reaction is believed to be as follows:

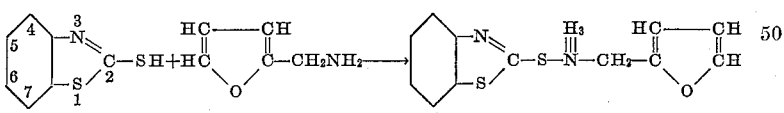

Other compounds of the invention may be prepared similarly. The crude products although of high purity may, if desired, be further purified by known treatments of purification.

This application is a division of application Serial No. 749,312, filed October 20, 1934.

It is apparent that a new group of highly valuable compounds has been discovered. It is intended that the patent shall cover, by suitable expression in the appended claims, all features of patentable novelty residing in the invention.

What I claim is:

1. Alpha furfuryl ammonium benzothiazyl sulphide.

2. A furfuryl ammonium benzothiazyl sulphide.

3. A primary furfuryl ammonium arylene thiazyl sulphide.

4. An ammonium benzothiazyl sulphide, the ammonium radical being substituted by at least one radical selected from the group consisting of furyl, furfuryl and beta furyl ethyl radicals.

5. An ammonium arylene thiazyl sulphide of the benzene and naphthalene series, the ammonium radical being substituted by at least one radical selected from the group consisting of furyl, furfuryl and beta furyl ethyl radicals.

6. An addition product of a mercaptoarylthiazole and an amine containing at least one radical containing a furane ring.

7. An addition product of mercaptobenzothiazole and a furfuryl amine.

8. An addition product of a mercapto arylene thiazole and an amine selected from the group consisting of furyl amines, furfuryl amines, and beta furyl ethyl amines.

9. Di(alpha furfuryl) ammonium benzothiazyl sulphide.

HOWARD I. CRAMER.